(12) United States Patent
Tsai et al.

(10) Patent No.: US 11,733,593 B2
(45) Date of Patent: Aug. 22, 2023

(54) ELECTRONIC DEVICE AND CAMERA DEVICE

(71) Applicant: Chicony Electronics Co., Ltd., New Taipei (TW)

(72) Inventors: Pei-Sheng Tsai, New Taipei (TW); Rong-Jhe Chen, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 17/246,910

(22) Filed: May 3, 2021

(65) Prior Publication Data

US 2022/0137489 A1 May 5, 2022

(30) Foreign Application Priority Data

Nov. 5, 2020 (TW) .................................. 109138643

(51) Int. Cl.
| | | |
|---|---|---|
| *G03B 17/56* | (2021.01) | |
| *F16M 13/02* | (2006.01) | |
| *F16M 11/18* | (2006.01) | |
| *F16M 11/04* | (2006.01) | |
| *F16H 19/04* | (2006.01) | |

(52) U.S. Cl.
CPC ......... *G03B 17/561* (2013.01); *F16M 11/048* (2013.01); *F16M 11/18* (2013.01); *F16M 13/022* (2013.01); *F16H 19/04* (2013.01); *F16H 2019/046* (2013.01)

(58) Field of Classification Search
CPC .. G03B 17/561; F16M 11/048; F16M 13/022; F16H 19/04
See application file for complete search history.

(56) References Cited

U.S. PATENT DOCUMENTS

| | | | |
|---|---|---|---|
| 7,677,815 B2 * | 3/2010 | Lane | G03B 17/04 348/376 |
| 2008/0079849 A1 * | 4/2008 | Inaba | H04N 5/2253 348/374 |

FOREIGN PATENT DOCUMENTS

| | | |
|---|---|---|
| CN | 111586265 A | 8/2020 |
| CN | 111723412 A | 9/2020 |

* cited by examiner

*Primary Examiner* — Minh Q Phan
(74) *Attorney, Agent, or Firm* — Locke Lord LLP; Tim Tingkang Xia, Esq.

(57) ABSTRACT

An electronic device includes a machine body, a functional module, a power transmission module and a retracting module. The functional module is to move with respect to the machine body. The power transmission module, disposed in the machine body, includes a transmission unit and a driving unit. The transmission unit includes a gear and a rack. The driving unit, connected to the gear, is to move with the functional module. The driving unit rotates the gear in a moving direction to mesh the rack so as to move the functional module in the moving direction. The retracting module, disposed in the machine body, includes a holding unit connected to the rack to provide the rack an avoiding path for the rack to disengage the gear, and a direction of the avoiding path is different from the moving direction. In additional, a camera device is also provided.

17 Claims, 11 Drawing Sheets

US 11,733,593 B2

ELECTRONIC DEVICE AND CAMERA DEVICE

CROSS REFERENCE TO RELATED APPLICATION

This application claims the benefits of Taiwan application Serial No. 109138643, filed on Nov. 5, 2020, the disclosures of which are incorporated by references herein in its entirety.

TECHNICAL FIELD

The present disclosure relates in general to an electronic device and a camera device.

BACKGROUND

In the art, an IP camera or a network camera generally includes a video camera module, an image compression module, a network communication module, a processor, and so on. With the rapid development of the Internet of Things, the demand and applications of IP camera are more and more extensive. For example, the IP camera is applied to capture images or videos of people and things within a certain range, and then the captured image data or video data is sent to a remote server through the Internet, and then these image data or video data can be displayed on a third-party mobile communication device.

Further, demand for a safe life is gradually increasing. In family life, the IP camera can be set to turn on photography function while nobody is at home, and to turn off photography function while people is at home. Generally speaking, termination of the aforesaid photography function can be done by disconnecting the network or the software/hardware for networking. However, a risk of IP camera being hacked is always there. Since a lens of the camera is aimed at people and things within a certain range, thus if the photography function of the camera is reactivated, then these people and things within this certain range would be arbitrarily peeped without any privacy. Hence, the aforesaid method in blocking the network by disconnecting the software and/or hardware can't effectively protect people's privacy at the application of the IP camera.

Thus, a privacy mode for the IP camera is introduced recently. The privacy mode is usually performed by utilizing a mechanism to pull the lens of the camera into the machine body. By providing the machine body to physically block the lens of the camera, the aforesaid hacking at the IP camera by reactivating the camera or unexpected peeping can be avoided.

Nevertheless, upon when the lens of the camera is located out of the machine body (i.e., the IP camera is activated), or while the lens of the camera is descending or ascending, if the lens of the camera is abruptly pushed toward the machine body by an unexpected foreign forcing, this foreign forcing may be transmitted and thus applied to the transmission mechanism through the lens of the camera. Contact between the driving and driven objects would cause some kinds of damage that may fail the mechanism for switching to the privacy mode. Hence, the issue how to overcome the aforesaid problem is definitely urgent to the skill in the art.

SUMMARY

An object of the present disclosure is to provide an electronic device that introduces a retracting module to disengage a rack temporarily from a corresponding gear, such that unexpected forcing leading to a damage between the gear and the rack can be avoided.

Another object of this present disclosure is to provide a camera device that can disengage a rack temporarily from a corresponding gear so as to retrieve a camera lens directly back to a position of privacy mode, such that unexpected forcing leading to a damage between the gear and the rack can be avoided.

In one embodiment of this disclosure, an electronic device includes a machine body, a functional module, a power transmission module and a retracting module. The functional module is to move with respect to the machine body. The power transmission module, disposed in the machine body, includes a transmission unit and a driving unit. The transmission unit includes a gear and a rack. The driving unit, connected to the gear, is to move with the functional module. The driving unit rotates the gear in a moving direction to mesh the rack so as to move the functional module in the moving direction. The retracting module, disposed in the machine body, includes a holding unit connected with the rack to provide the rack an avoiding path for the rack to disengage the gear, and a direction of the avoiding path is different from the moving direction.

In another embodiment of this disclosure, a camera device includes the electronic device, wherein the functional module includes a photography module.

In one embodiment of this disclosure, when the gear is under a push greater than a predetermined value, the rack is pushed by the gear to move along the avoiding path.

In one embodiment of this disclosure, the holding unit is used for providing a foreign forcing to force the rack to engage the gear; wherein, when the gear is under the push, the rack endures a force larger than a force component of the foreign forcing applying to the rack, then the rack is pushed to move by the gear, and the rack further moves the holding unit.

In one embodiment of this disclosure, when the driving unit drives the functional module to move in the moving direction, the force is a sum of a force component of the push applied to the rack, a force component of a gravity of the functional module applied to the rack and a force component of a torque of the driving unit applied to the rack; wherein, when the driving unit does not drive the functional module to move in the moving direction, the force is a sum of the force component of the push applied to the rack and the force component of the gravity of the functional module applied to the rack.

In one embodiment of this disclosure, the retracting module includes a fastener member connected with the holding unit to have the holding unit and the rack to move together and to move with respect to the fastener member, the fastener member is used for limiting the rack to move in the direction of the avoiding path, and the direction of the avoiding path is a direction that the rack moves away from the gear.

In one embodiment of this disclosure, the fastener member includes a first plate, a second plate and a third plate, two ends of the first plate are respectively connected to the second plate and the third plate opposite to the second plate, a space formed by the first plate, the second plate and the third plate is used accommodating the rack, and the avoiding path is formed between the holding unit and the first plate.

In one embodiment of this disclosure, an inner surface of the second plate is parallel to an outer surface of the rack, an inner surface of the third plate is parallel to another outer surface of the rack, a normal vector direction of the inner surface of the second plate is parallel to the moving direction, and a normal vector direction of the inner surface of the third plate is parallel to the moving direction.

In one embodiment of this disclosure, an inner surface of the second plate is parallel to an outer surface of the rack, an inner surface of the third plate is parallel to another outer surface of the rack, a normal vector direction of the inner surface of the second plate is not parallel to the moving direction, and a normal vector direction of the inner surface of the third plate is not parallel to the moving direction.

In one embodiment of this disclosure, the holding unit includes an elastic member, and the rack is located between the elastic member and the gear.

In one embodiment of this disclosure, the holding unit includes a first magnetic member and a second magnetic member, the first magnetic member is disposed at the rack, the second magnetic member is disposed at the fastener member, the second magnetic member is disposed oppositely to the first magnetic member, and the first magnetic member is magnetically repulsive to the second magnetic member.

In one embodiment of this disclosure, the holding unit includes a plurality of spring arms, each of the plurality of spring arms is connected to the rack, and each of the plurality of spring arms is integrated with the rack to form a modified rack.

As stated, in the electronic device and the camera device provided by this disclosure, the retracting module is used for providing the rack an avoiding path. Thus, the rack can be disengaged from the gear. By moving the rack to be separated from the gear, possible excessive stress concentration between the rack and the gear can be avoided, and thus damage from unexpected push between the gear and the rack can be prevented.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
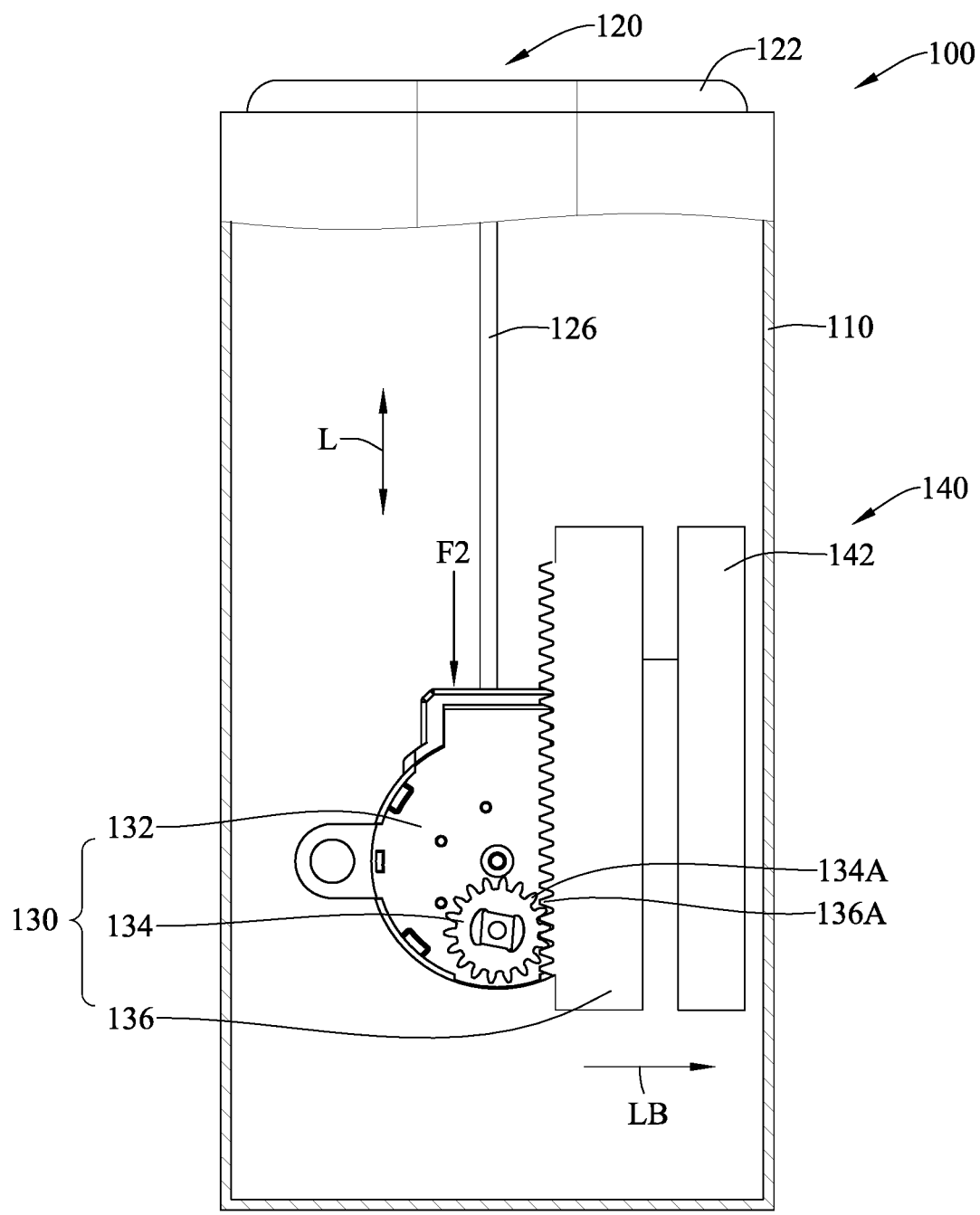
FIG. 1 is a schematic view of the electronic device in accordance with an embodiment of this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. In all of the drawings, the same numbers are used to indicate the same or similar elements.

In the instant disclosure, terms "coupled" or "connected" may be used to indicate that two or more elements physically or electrically contact each other directly, or may be used to indicate that two or more elements physically or electrically contact each other indirectly. Furthermore, the terms "coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

FIG. 1 is a schematic view of the electronic device in accordance with an embodiment of this disclosure. As shown, in this embodiment, the electronic device 100 includes a machine body 110, a functional module 120, a power transmission module 130 and a retracting module 140. The functional module 120 can displace with respect to the machine body 110. The power transmission module 130, the retracting module 140 and part of the functional module 120 are disposed inside the machine body 110. For a concise explanation purpose, part of the machine body 110 in FIG. 1 are cut off so as to show the power transmission module 130 and the retracting module 140 thereinside.

In this embodiment, the power transmission module 130 includes a driving unit 132 and a transmission unit consisted of a gear 134 and a rack 136. Namely, the electronic device 100 of this embodiment utilizes the gear 134 and the rack 136 to form the transmission unit for owing the functional module 120. The functional module 120 includes a moving body 122 and a connecting member 126, in which the moving body 122 can be further furnished with corresponding functional components as a photography module or a detection module. One end of the connecting member 126 is connected to the moving body 122, while another end thereof is connected to the driving unit 132, such that the driving unit 132 can move the functional module 120. It shall be explained that the connecting member 126 can be, but not limited to, a linking bar.

In this embodiment, the driving unit 132 is connected to the gear 134, in which the gear 134 has a specific number of teeth 134A. The rack 136 is furnished with a plurality of teeth 136A arranged in a moving direction L. The teeth 134A of the gear 134 are to mesh the teeth 136A of the rack 136. The driving unit 132 can be a motor rotating the gear 134, so as further to displace the rack 136 in a corresponding direction in the moving direction through the meshing between the teeth 134A of the gear 134 and the teeth 136A of the rack 136. Namely, with the pairing of the gear 134 and the rack 136, the driving unit 132 can transform a rotational motion into a linear motion, such that the functional module 120 can be lifted up or down accordingly.

Figure 2:
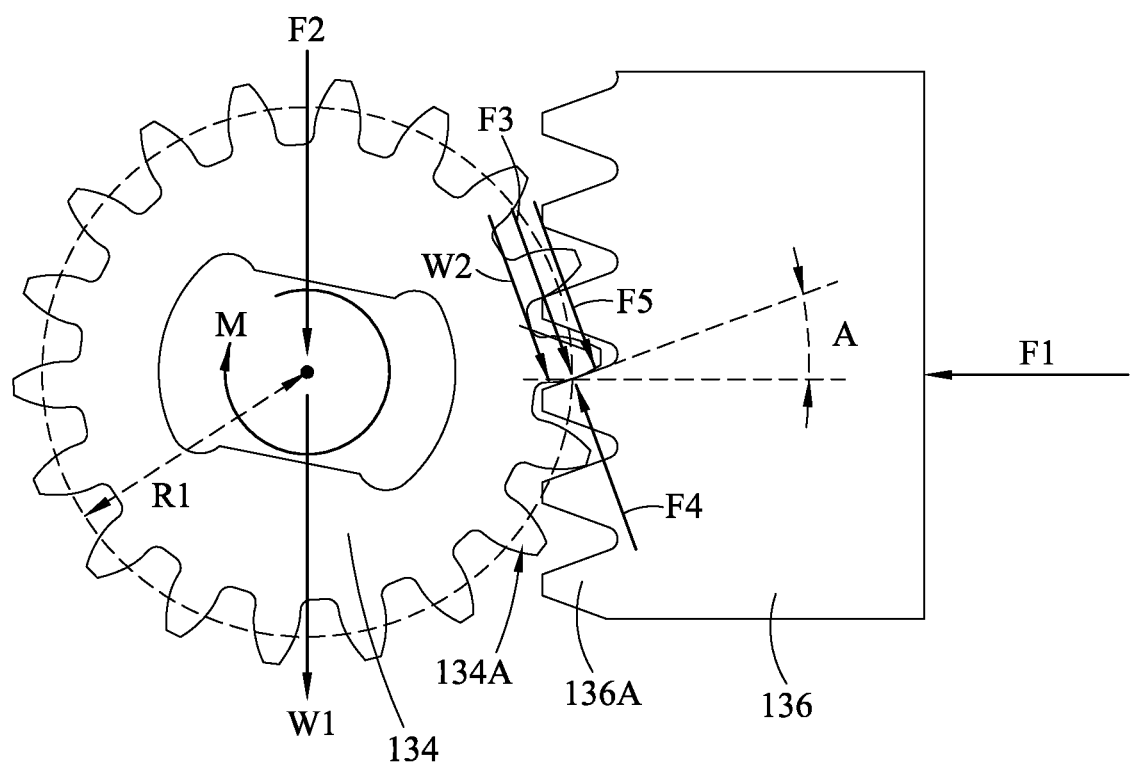
FIG. 2 shows schematically the gear and the rack of FIG. 1.

FIG. 2 shows schematically the gear 134 and the rack 136 of FIG. 1. Referring to FIG. 1 and FIG. 2, in the power transmission module 130, since a pressure angle A is assigned for the gear 134 to contact the rack 136, so the gear 134 would follow the pressure angle A to transmit a directional force to the rack 36. The pitch diameter (or reference diameter) of the gear 134 is twice of the pitch radius R1. At this time, the rack 136 is forced to contact the gear 34 by the foreign forcing F1. Namely, the foreign forcing F1 is applied to make the rack 136 mesh the gear 134. Generally speaking, the foreign forcing F1 is sufficient to fix the rack 136 and to help the rack 136 to act against the gravity W1 of the functional module 120 and the force component of the torque M by the driving unit 132. The force component of the gravity W1 in the direction of the pressure angle A is denoted by W2, the force component of the torque M in the direction of the pressure angle A is denoted by F3, the force component of the foreign forcing F1 at the rack 136 in the direction of the pressure angle A is denoted by F4, and then W2, F3 and F4 can be derived from the following mathematical equation (1) to mathematical equation (3):

$$W2 = W1 \times \cos A \quad (1);$$

$$F3 = M/R1 \quad (2);$$

$$F4 = F1 \times \sin A \quad (3).$$

While the driving unit 132 drives the functional module 120 to move in the moving direction L, a sum of the force component W2 of the gravity W1 in the direction of the pressure angle A and the force component F3 of the torque M in the direction of the pressure angle A is equal to the force component F4 of the foreign forcing F1 of the rack 136 in the direction of the pressure angle A, and the related mathematical equation (4) is:

$$W2 + F3 = F4 \quad (4).$$

Therefore, the rack 136 is stationary without any displacement.

By combining the aforesaid mathematical equation (1) to equation (4), the minimum foreign forcing F1 of the rack 136 can be calculated by the following mathematical equation (5):

$$F1 = (W1 \times \cos A + M/R1)/\sin A \quad (5).$$

As shown in FIG. 1, the electronic device 100 includes a retracting module 140, and the retracting module 140 can further include a holding unit 142 connected with the rack 136 by having the rack 136 to dispose between the holding unit 142 and the gear 134. The holding unit 142 can provide the aforesaid foreign forcing F1 to the rack 136 so as to ensure that the rack 136 can mesh the gear 134. In this disclosure, the holding unit 142 can be embodied to various types, such as the spring 242A in FIG. 3, the rubber 342A in FIG. 4, the first magnetic member 442A, the second magnetic member 442B in FIG. 5 and the like magnetic element, or the first spring arm 542A and the second spring arm 542B in FIG. 6. In practice, the embodiment of the holding unit 142 is up to the requirements thereof.

While the driving unit 132 drives the functional module 120 to move in the moving direction L, and if the functional module 120 is suddenly pushed toward the machine body 110 by the push F2, then the gear 134 would sustain additional push F2. At this time, the force component F5 of the push F2 in the direction of the pressure angle A can be calculated through the following mathematical equation (6):

$$F5 = F2 \times \cos A \quad (6).$$

While the functional module 120 is moving in the moving direction L, and when it is affected by the push F2, then it is quite possible that the meshing between the gear 134 and the rack 136 might be improper, and by which possible breakdown may happen to the gear 134, the rack 136 or even the driving unit 132. Thus, in this embodiment, the retracting module 140 can further drive the rack 136 to separate from the gear 134, such that possible stress concentration between the gear 134 and the rack 136 can be avoided by moving the rack 136.

From the aforesaid mathematical equation (4), it is known that, when the total forcing at the gear 134 in the direction of the pressure angle A is added by the force component F5 of the push F2 in the same direction of the pressure angle A, the total forcing at the gear 134 in the direction of the pressure angle A would be larger than the force component F4 of the foreign forcing F1 at the rack 136 in the direction of the pressure angle A. Simultaneously, the forcing between the gear 134 and the rack 136 would be larger than the forcing applied at the rack 136 (the force component F4 of the forcing F1 in the direction of the pressure angle A). Via the retracting module 140, the rack 136 would move in an opposite direction or a direction different to the direction of the foreign forcing F1. In other words, when the gear 134 is under a push F2, the rack 136 would sustain a force; and, when the force is larger than the force component F4 of the foreign forcing F1 applied at the rack 136, the rack 136 cannot engage the gear 134 via the push from the foreign forcing F1. When the driving unit 132 moves the functional module 120 in the moving direction L, the force is the summation of the force component of the push F2 applied at the rack 136, the force component of the gravity W1 of the functional module 120 applied at the rack 136, and the force component of the torque M that the driving unit 132 applies at the rack 136. Namely, when the total forcing of the force component F5 of the push F2 in the direction of the pressure angle A, the force component W2 of the gravity W1 in the direction of the pressure angle A, and the force component F3 of the torque M in the direction of the pressure angle A is larger than the force component F4 of the foreign forcing F1 in the direction of the pressure angle A, the rack 136 would be pushed by the gear 134. The holding unit 142 of the retracting module 140 is used for providing the rack 136 an avoiding path and a direction of the avoiding path LB is different to the moving direction L. The direction of the avoiding path LB is the direction that the rack 136 is to leave the gear 134. In other words, when the gear 134 is under a push F2 larger than a predetermined value, the rack 136 would be pushed to move along the avoiding path by the gear 134, and the rack 136 also moves the holding unit 142 as well. The predetermined value can be obtained by calculating the foreign forcing F1, the gravity W1 and the torque M. For example, the predetermined value T can be the result value that the force component F4 of the foreign forcing F1 in the direction of the pressure angle A subtracts both the force component W2 of the gravity W1 in the direction of the pressure angle A and the force component F3 of the torque M in the direction of the pressure angle A. Thereupon, the rack 136 can be disengaged from the gear 134, and thus the stress concentration between the gear 134 and the rack 136 can be avoided by moving the rack 136. When the rack 136 is moved to be separated from the gear 134, the functional module 120 can move in the moving direction L so as to be nested inside the machine body 110, and thus both the gear 134 and the rack 136 can be away from damaged by the push F2. In other words, when the gear 134 is under a push F2 larger than a predetermined value T, the rack 136 would be push to move by the gear 134. The aforesaid predetermined value T can be obtained from calculating the foreign forcing F1, the gravity W1 and the torque M. For example, the predetermined value T can be obtained through the following mathematical equation (7):

$$T=(F4-W2-F3)/\cos A \qquad (7)$$

On the other hand, while the functional module 120 is located outside the machine body 110 of the electronic device 100, and the driving unit 132 does not drive the functional module 120 to move in the moving direction L (i.e., the driving unit 132 is stationary, and thus the torque M of the driving unit 132 is 0). When the functional module 120 is pushed toward the machine body 110 by the push F2, the gear 134 is applied also by the push F2, and the rack 136 would sustain a force and be pushed to move by the gear 134. The force would be the sum of the force component of the push F2 applied to the rack 136 and the force component of the gravity W1 of the functional module 120 applied to the rack 136. Namely, the sum is formed by adding the force component F5 of the push F2 in the direction of the pressure angle A and the force component W2 of the gravity W1 in the direction of the pressure angle A. When the force is larger than the force component F4 of the foreign forcing F1, the rack 136 would be driven by the gear 134. In other words, when the gear 134 is under a push F2 larger than a predetermined value T, the rack 136 would be pushed to move by the gear 134. The aforesaid predetermined value T can be obtained from calculating the foreign forcing F1 and the gravity W1. For example, the predetermined value T can be obtained through the following mathematical equation (8):

$$T=(F4-W2)/\cos A \qquad (8)$$

Besides, the retracting module 140 can further include at least one fastener member for limiting the rack 136 to follow the direction of the avoiding path LB. In the following description, FIG. 3 through FIG. 9 are raised as examples to explain some of various embodiments for the holding unit and the fastener member.

Figure 3:
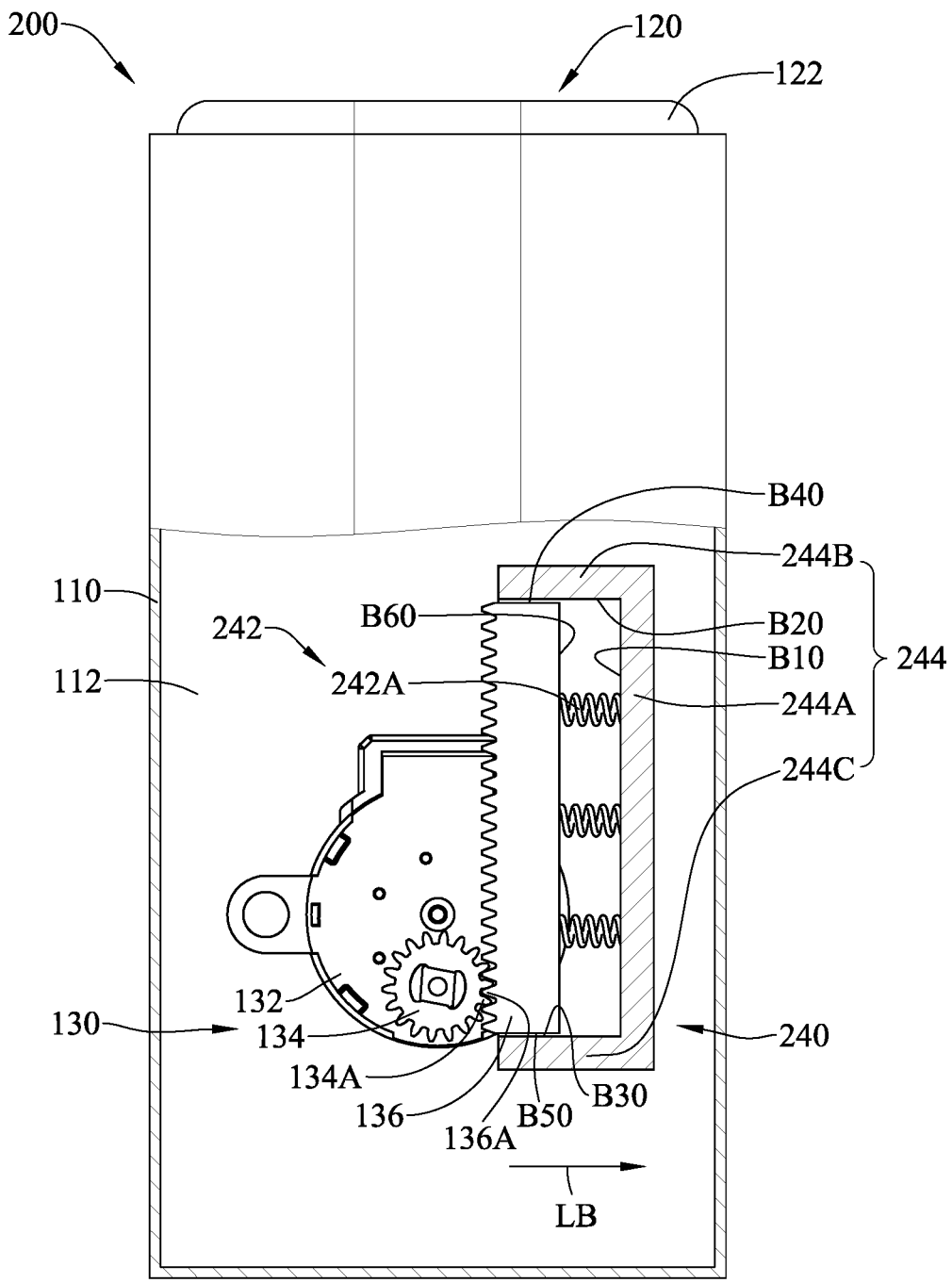
FIG. 3 is a schematic view of the electronic device in accordance with another embodiment of this disclosure.

FIG. 3 is a schematic view of another embodiment of the electronic device in accordance with this disclosure. Referring to FIG. 2 and FIG. 3, in this embodiment, elements of the power transmission module 130, the retracting module 240 and part of the functional module 120 are disposed in an accommodation space 112 of the machine body 110. For a concise explanation, part of the machine body 110 in FIG. 3 are removed so as to expose some elements thereinside, including elements of the power transmission mechanism 130 and the retracting module 240. Differences between the electronic device 200 of FIG. 3 and the electronic device 100 of FIG. 1 include at least that the retracting module 240 includes the holding unit 242 and the fastener member 244. The rack 136 is connected to the holding unit 242, and the holding unit 242 is further connected to the fastener member 244. The holding unit 242 and the rack 136 are moved together and both movable with respect to the fastener member 244. The holding unit 242 includes an elastic member. The elastic member could be implemented as at least one spring 242A (three shown in the figure) in the embodiment of FIG. 3, or a rubber 342A in another embodiment of FIG. 4. However, more embodiments can be provided but not shown herein according to this disclosure. In this embodiment shown in FIG. 3, the rack 136 is located between the springs 242A and the gear 134, and the springs 242A, preferably in parallel, are disposed between the rack 136 and the fastener member 244.

Under such an arrangement, the springs 242A, moved with the rack 136, are used for providing a foreign forcing (for example, the foreign forcing F1 of FIG. 2). The foreign forcing can be the push provided by the springs 242A to push the rack 136 to contact against the gear 134, so that the teeth 136A of the rack 136 can be meshed tightly with the teeth 134A of the gear 134. When the gear 134 is under a push F2, the push F2 would apply the rack 136 a force component (i.e., the force component F5 of the push F2 in the direction of the pressure angle A), the gravity W1 of the functional module 120 would apply the rack 136 another force component (i.e., the force component W2 of the gravity W1 in the direction of the pressure angle A), and the torque M of the driving unit 132 would apply the rack 136 a further force component (i.e., the force component F3 of the torque M in the direction of the pressure angle A). If the total forcing of these three force components is greater than the force component of the spring forces that the springs 242A applies to the rack 136 (for example, the force component F4 of the foreign forcing F1 in FIG. 2), the rack 136 would be pushed to move by the gear 134 in a direction against the foreign forcing F1 (i.e., the direction of the avoiding path LB). In addition, the rack 136 depresses the spring 242A and moves in the direction of the avoiding path LB. Namely, the rack 136 would avoid the contact with the gear 134 by retrieving in the direction of the avoiding path LB. Thereupon, no stress would exist between the rack 136 and the gear 134, and thus any possible damage upon the gear 134 or the rack 136 caused by the push F2 can be avoided.

In one embodiment, during the aforesaid retrieval of the rack 136, the rack 136 can move into the fastener member 244, and the fastener member 244 acts as a limit to the direction of the avoiding path LB. In practice, the fastener member 244 includes a first plate 244A, a second plate 244B and a third plate 244C. The first plate 244A has two opposite ends to connect the second plate 244B and the third plate 244C, respectively. The second plate 244B and the third plate 244C stand oppositely to each other, and the first plate 244A, the second plate 244B and the third plate 244C are integrated to form a space for accommodating the rack 136. An inner surface B20 of the second plate 244B and an outer surface B40 of the rack 136 are parallel to each other, and an inner surface B30 of the third plate 244C and another outer surface B50 of the rack 136 are parallel to each other. One end of each of the springs 242A is connected to a bottom surface B60 of the rack 136, while another end thereof is connected to an inner surface B10 of the first plate 244A. In this embodiment, the avoiding path is formed between the rack 136 and the first plate 244A. The direction of the avoiding path LB is the direction that the rack 136 moves towards the inner surface B10 of the first plate 244A.

The aforesaid is an example of the case where the functional module 120 moves in the moving direction L, when the push F2 is applied. It shall be explained that, in one embodiment, when the functional module 120 (such as the photography module 124 of the functional module 120 in FIG. 11) is outside the machine body 110 and does not move, the torque M of the driving unit 132 would be 0, and the force applied to the rack 136 in the aforesaid mathematical equation (4) can obey the following mathematical equation (9):

$$W2 < F4 \qquad (9).$$

Thereupon, only when an additional push F2 exists, and the total forcing of the force component F5 of the push F2 in the direction of the pressure angle A and the force component W2 of the gravity W1 in the direction of the pressure angle A is greater than the force component F4 of the foreign forcing F1, thus the rack 136 can be pushed to move by the gear 134 so as to drive the rack 136 to move oppositely or in a direction opposite to the foreign forcing F1. Otherwise, the foreign forcing F1 can still push the rack 136 to approach the gear 134. In one embodiment, on the outer surface B40 and the outer surface B50 of the rack 136, and the inner surfaces B20, B30 of the fastener member 244, blocking structures or limiting structures (not shown in the figure) can be provided so as not to have the rack 136 affected by the foreign forcing F1, for being not to be pushed out of the fastener member 244 (such as in a direction opposite to the direction of the avoiding path LB of FIG. 3). In other words, the fastener member 244 of this disclosure can be applied to limit the moving range of the rack 136.

Figure 4:
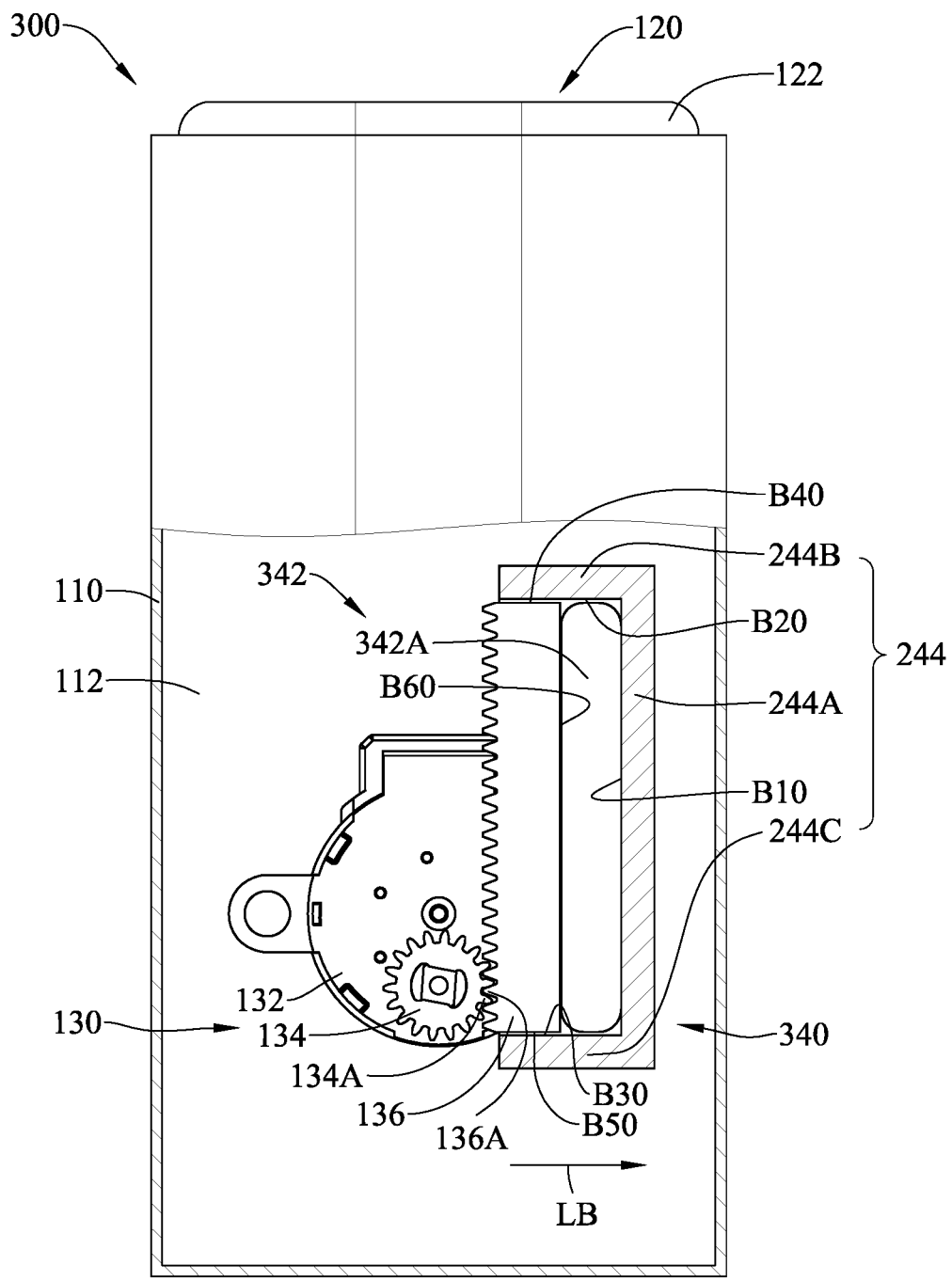
FIG. 4 is a schematic view of the electronic device in accordance with a further embodiment of this disclosure.

FIG. 4 is a schematic view of the electronic device in accordance with a further embodiment of this disclosure. Referring to FIG. 2 and FIG. 4, in this embodiment, elements of the power transmission module 130, the retracting module 340 and part of the functional module 120 are disposed in an accommodation space 112 of the machine body 110. For a concise explanation, part of the machine body 110 in FIG. 4 are removed so as to expose some elements thereinside, including elements of the power transmission mechanism 130 and a retracting module 340. Differences between the electronic device 300 of FIG. 4 and the electronic device 100 of FIG. 1 include at least that the retracting module 340 includes a holding unit 342 and the fastener member 244, and the holding unit 342 includes a rubber 342A. It is seen that differences between the electronic devices 200 of FIG. 3 and the electronic devices 300 of FIG. 4 include at least that: the elastic member adopts the rubber 342A serving a function resembling to that of the springs 242A of FIG. 3. Practically, one side of the rubber 342A contacts against the bottom surface B60 of the rack 136, while another side of the rubber 342A contacts against the inner surface B10 of the first plate 244A. Further, the rubber 342A is located between the rack 136 and the first plate 244A. Preferably, the rubber 342A is disposed in the space formed by the first plate 244A of the fastener member 244, the second plate 244B and the third plate 244C. When the rubber 342A is depressed to deform, the rack 136 would move toward the inner surface B10 of the first plate 244A; i.e., the rack 136 moves in the direction of the avoiding path LB.

When the push F2 is applied to the gear 134, the elastic member (such as the aforesaid springs 242A and rubber 342A) would be compressed or squeezed to deform by the rack 136, and thus a corresponding resilience could be accumulated. When the push F2 is lifted from the gear 134, the elastic member compressed or squeezed to deform by the rack 136 would release the accumulated resilience to push the rack 136 toward the gear 134 to re-engage the rack 136 and the gear 134. On the outer surface B40 and the outer surface B50 of the rack 136, and the inner surfaces B20, B30 of the fastener member 244, blocking structures or limiting structures (not shown in the figure) can be provided so as to avoid the rack 136 being pushed out of the space formed by the first plate 244A, the second plate 244B and the third plate 244C by the accumulated resilience.

Figure 5:
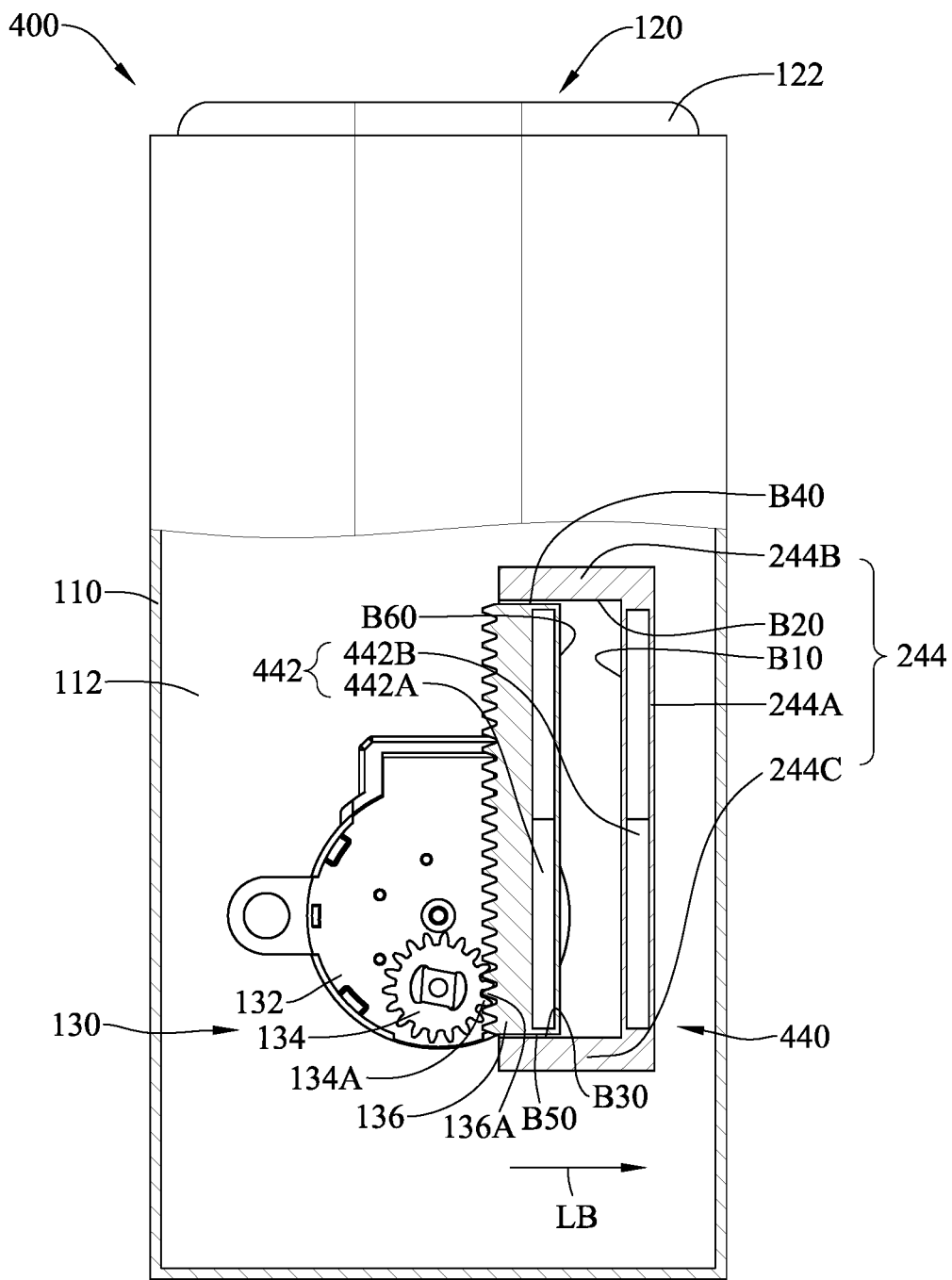
FIG. 5 is a schematic view of the electronic device in accordance with one more embodiment of this disclosure.

FIG. 5 is a schematic view of the electronic device in accordance with one more embodiment of this disclosure. Referring to FIG. 2 and FIG. 5, in this embodiment, elements of the power transmission module 130, the retracting module 440 and part of the functional module 120 are disposed in an accommodation space 112 of the machine body 110. For a concise explanation, part of the machine body 110 in FIG. 5 are removed so as to expose some elements thereinside, including elements of the power transmission mechanism 130 and the retracting module 440. Differences between the electronic devices 400 of FIG. 5 and the electronic device 100 of FIG. 1 include at least that: the retracting module 440 can include a holding unit 442 and a fastener member 244. The holding unit 442 includes a first magnetic member 442A and a second magnetic member 442B. In this embodiment, the first magnetic member 442A is disposed in the rack 136, the second magnetic member 442B is disposed in the first plate 244A, and the second magnetic member 442B is positioned in correspondence with the first magnetic member 442A. An avoiding path is formed between the bottom surface B60 of the rack 136 and the inner surface B10 of the first plate 244A. In this embodiment, the first magnetic member 442A is disposed in, but not limited to, the rack 136; and, the second magnetic member 442B is disposed in, but not limited to, the first plate 244 of the fastener member 244A. In another embodiment, the first magnetic member 442A can be also provided on the bottom surface B60 of the rack 136, and the second magnetic member 442B can be provided on the inner surface B10 of the first plate 244A. The first magnetic member 442A and the second magnetic member 442B are magnetically repulsive. Under such an arrangement, the first magnetic member 442A and the second magnetic member 442B are magnetically repulsive so as to provide foreign forcing (such as the foreign forcing F1 in FIG. 2) to push the rack 136 toward the gear 134 and then to have the teeth 136A of the rack 136 to mesh the teeth 134A of the gear 134. When the gear 134 is under a push F2, if the rack 136 endures a force (including at least the force component of the push F2 applied to the rack 136 and the force component of the gravity W1 of the functional module 120 applied to the rack 136) larger than the force component F4 of the foreign forcing F1 applied to the rack 136 (i.e., the force component of the magnetic repulsion formed between the first magnetic member 442A and the second magnetic member 442B), the gear 134 would drive the rack 136 to move toward the inner surface B10 of the first plate 244A in the direction of the avoiding path LB, such that the rack 136 would be disengaged from the gear 134, and thus possible damage at the gear 134 or the rack 136 caused by the push F2 can be avoided.

Figure 6:
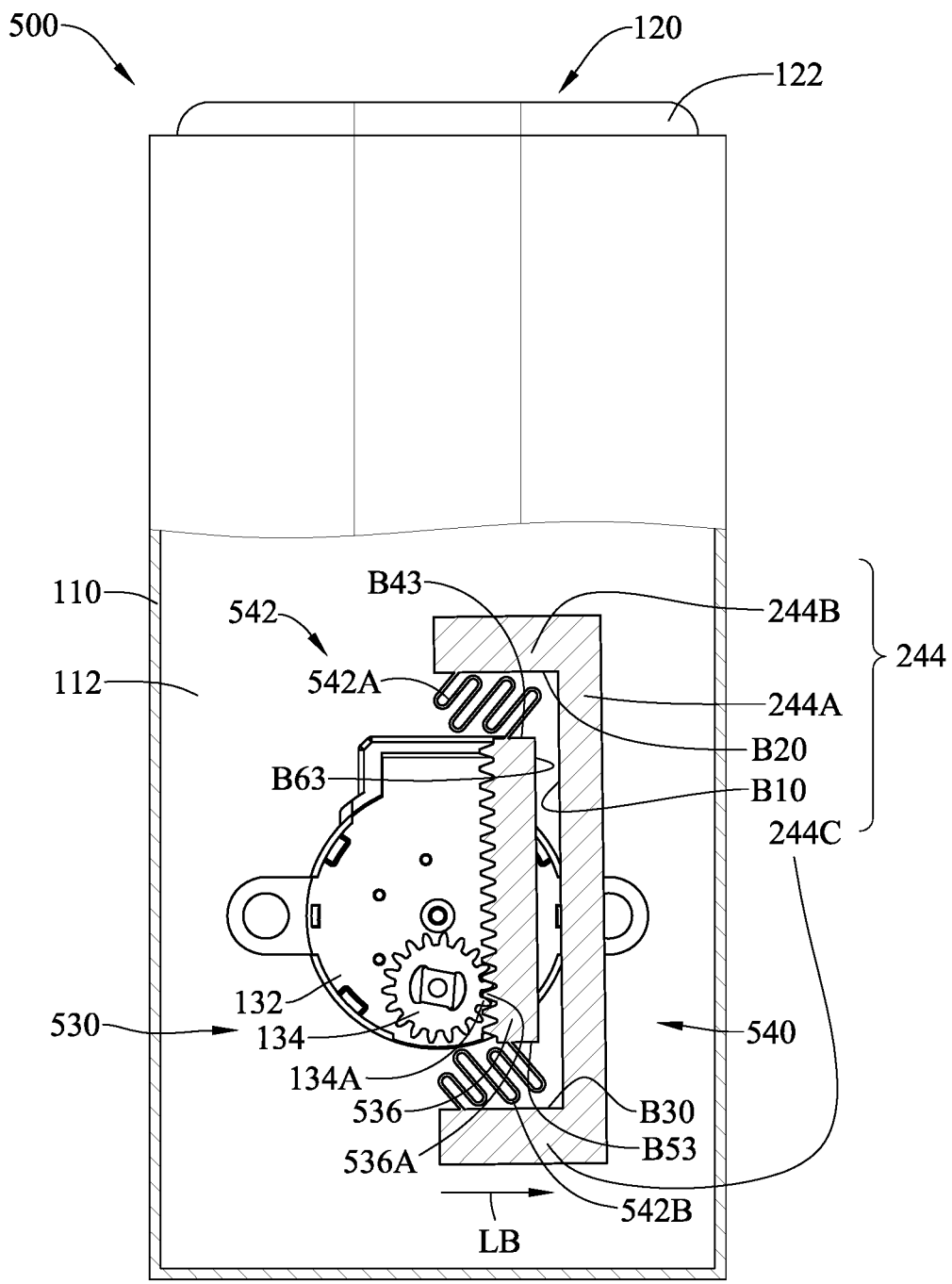
FIG. 6 is a schematic view of the electronic device in accordance with a further one more embodiment of this disclosure.

FIG. 6 is a schematic view of the electronic device in accordance with further one more embodiment of this disclosure. Referring to FIG. 2 and FIG. 6, in this embodiment, elements of the power transmission module 530, the retracting module 540 and part of the functional module 120 are disposed in an accommodation space 112 of the machine body 110. For a concise explanation, part of the machine body 110 in FIG. 6 are removed so as to expose some elements thereinside, including elements of the power transmission mechanism 530 and the retracting module 540. Differences between the electronic devices 500 of FIG. 6 and the electronic device 100 of FIG. 1 include at least that: the retracting module 540 includes a holding unit 542 and a fastener member 244. The holding unit 542 includes a first spring arm 542A and a second spring arm 542B. The first spring arm 542A, the second spring arm 542B and the rack 536 of the power transmission module 530 are integrated to form a modified rack, and the first spring arm 542A and the second spring arm 542B are connected respectively to two opposite gaps between the rack 536 and the fastener member 244, in which the modified rack is integrated into a one-piece structure. In other embodiments, the modified rack can have the rack 536 to connect the first spring arm 542A and the second spring arm 542B. Practically, an accommodation space formed by the first plate 244A, the second plate 244B and the third plate 244C can be used for accommodating the rack 536. The rack 536 includes a bottom surface B63, a first outer surface B43 and a second outer surface B53 opposite to the first outer surface B43. The first spring arm 542A is connected between an inner surface B20 of the second plate 244B and a first outer surface B43 of the rack 536, and the second spring arm 542B is connected between an inner surface B30 of the third plate 244C and a second outer surface B53 of the rack 536. On another hand, the bottom surface B63 of the rack 536 faces the inner surface B10 of the first plate 244A. Namely, an avoiding path is formed between the bottom surface B63 of the rack 536 and the inner surface B10 of the first plate 244A. When the rack 536 moves toward the first plate 244A in the direction of the avoiding path LB, the fastener member 244 is used to limit the direction of the avoiding path LB.

Under such an arrangement, the modified rack consisted of the first spring arm 542A, the second spring arm 542B and the rack 536 can be moved between the gear 134 and the fastener member 244. The first spring arm 542A and the second spring arm 542B are used for providing an elastic force such as the foreign forcing F1 of FIG. 2, such that the rack 536 can contact the gear 134 so as to have the teeth 536A of the rack 536 to mesh the corresponding teeth 134A of the gear 134. When the gear 134 is under a push F2, if the rack 136 endures a force (including at least the force component of the push F2 applied to the rack 136 and the force component of the gravity W1 of the functional module 120 applied to the rack 136) larger than the force component F4 of the foreign forcing F1 applied to the rack 136 (i.e., the force component of the spring force of the first spring arm 542A and the second spring arm 542B), the gear 134 would drive the rack 536 to move. At this time, deformations at the first spring arm 542A and the second spring arm 542B would make the rack 536 move in the direction of the avoiding path LB, such that the rack 536 would be disengaged from the gear 134, and thus possible damage at the gear 134 or the rack 536 caused by the push F2 can be avoided. Practically, each of the first spring arm 542A and the second spring arm 542B can be formed by connecting a plurality of slender cantilever beam structures, and, through this geometric design and the number of the cantilever beam structures, the required foreign forcing F1 can be formed. The deformation contributed by the cantilever beams can fulfill the movement of the rack 536 in the direction of the avoiding path LB. In this disclosure, the number of the cantilever beams is not specifically defined, but a sufficient number of the cantilever beams can better distribute the internal stress of the cantilever beam structures caused by deformations at individual cantilever beams, such that the stress would not exceed the material's yield strength, and also the behavior of plastic deformation of the cantilever beam can be preserved.

It shall be explained that, from FIG. 2 to FIG. 6, the fastener member can be used to limit the movement of the rack to follow the direction of the avoiding path LB. In the following FIG. 7 through FIG. 9, more examples will be provided.

Figure 7:
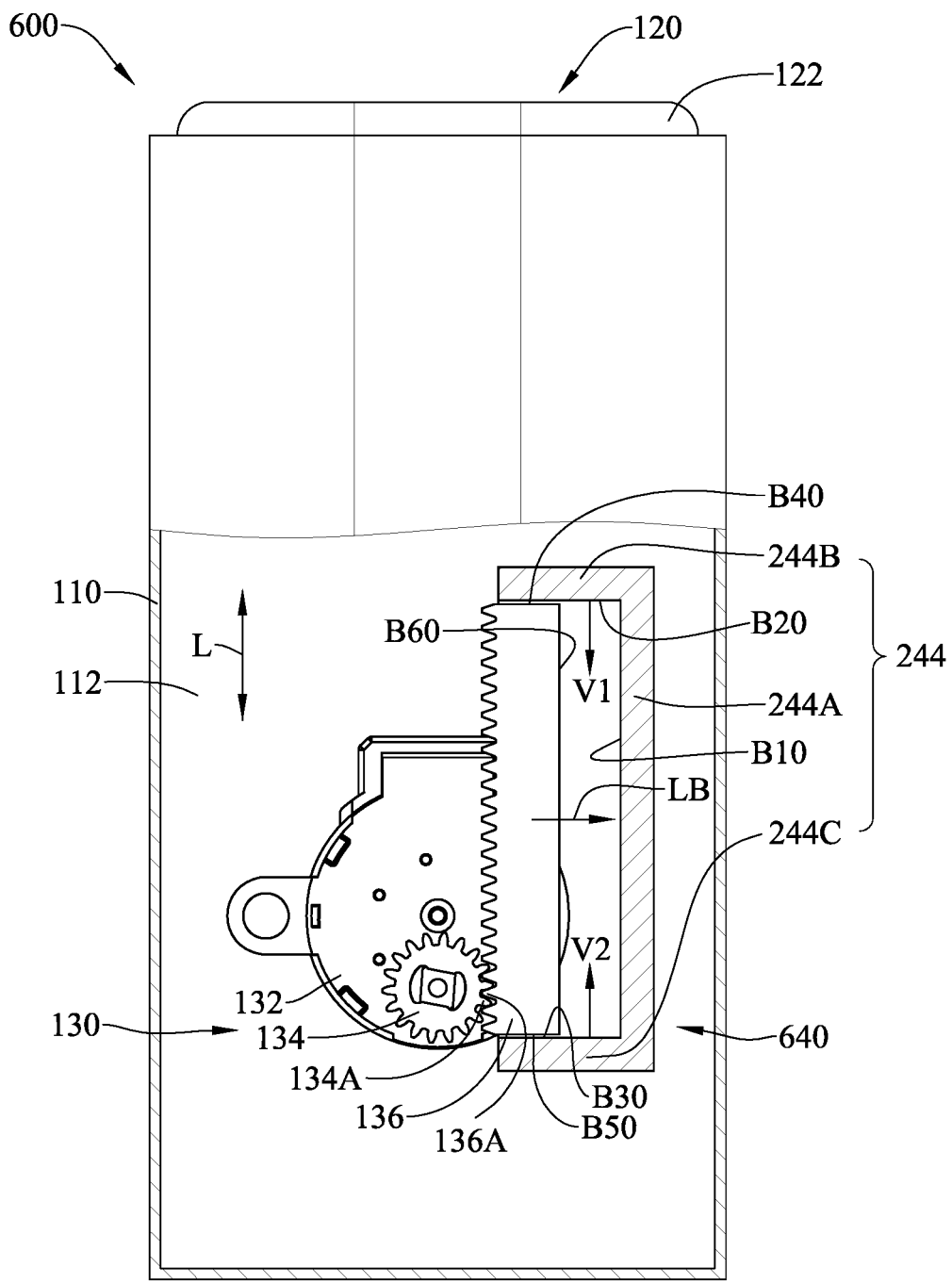
FIG. 7 is a schematic view of the fastener member of the electronic device in accordance with an embodiment of this disclosure.

FIG. 7 is a schematic view of the fastener member of the electronic device in accordance with an embodiment of this disclosure. In this embodiment, elements of the power transmission module 130, the retracting module 640 and part of the functional module 120 are disposed in an accommodation space 112 of the machine body 110. For a concise explanation, part of the machine body 110 in FIG. 7 are removed so as to expose some elements thereinside, including elements of the power transmission mechanism 130 and the retracting module 640. The electronic devices 600 of FIG. 7 can be treated as an exemplary example of the electronic device 100 of FIG. 1. In this embodiment, the fastener member 244 is used for fixing the holding unit 142, so that the holding unit 142 can connect and move between the rack 136 and the fastener member 244. The holding unit 142 is used for providing the rack 136 an avoiding path, while the fastener member 244 is used to limit and fix the direction of the avoiding path LB. In this embodiment, the fastener member 244 can be the same as the aforesaid fastener member 244 of FIG. 3 to FIG. 6, and the holding unit 142 can be applied as the spring 242A of FIG. 3, the rubber 342A of FIG. 4, the first magnetic member 442A or the second magnetic member 442B of FIG. 5, or the first spring arm 542A or the second spring arm 542B of FIG. 6. In addition, the shape of the fastener member 244 can be also one of factors that can limit the direction of the avoiding path LB of the rack 136. As shown in FIG. 7, in this embodiment, an avoiding path is formed between the rack 136 and the first plate 244A, and the direction of the avoiding path LB is the direction from the rack 136 to the inner surface B10 of the first plate 244A. In addition, the shape of the fastener member 244 can be also one of the factors that can limit the angle formed by the direction of the avoiding path LB and a reference direction such as the moving direction L. As shown in FIG. 7, in the fastener member 244, the inner surface B20 of the second plate 244B is parallel to the inner surface B30 of the third plate 244C, the inner surface B20 of the second plate 244B is parallel to the outer surface B40 of the rack 136, and the inner surface B30 of the third plate 244C is parallel to the outer surface B50 of the rack 136. Namely, the outer surface B40 and the opposite outer surface B50 of the rack 136 would move along and between the inner surface B20 of the second plate 244B and the inner surface B30 of the third plate 244C. That is, the angle formed by the direction of the avoiding path LB and the moving direction L would be related to the arrangement and structuring of the inner surface B20 of the second plate 244B and the inner surface B30 of the third plate 244C. For example, in this embodiment, the normal-vector direction V1 of the inner surface B20 of the second plate 244B and the normal vector direction V2 of the inner surface B30 of the third plate 244C are both parallel to the moving direction L, while the inner surface B20 of the second plate 244B and the inner surface B30 of the third plate 244C are both perpendicular to the moving direction L. As such, the inner surface B20 of the second plate 244B and the inner surface B30 of the third plate 244C can limit the angle formed by the direction of the avoiding path LB and the moving direction L. By having FIG. 7 as an example, the direction of the avoiding path LB is perpendicular to the moving direction L.

Figure 8:
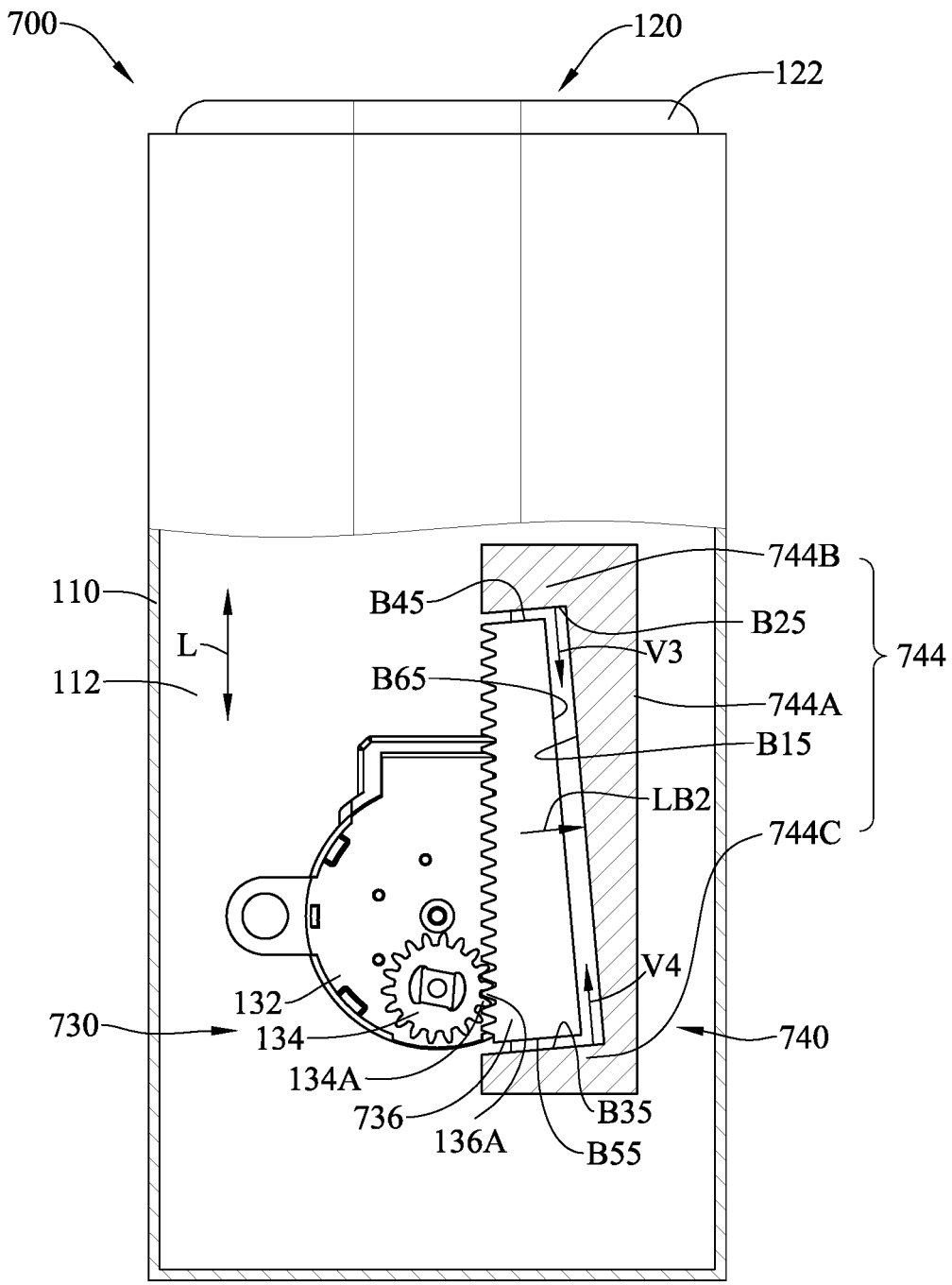
FIG. 8 is a schematic view of the fastener member of the electronic device in accordance with another embodiment of this disclosure.

FIG. 8 is a schematic view of the fastener member of the electronic device in accordance with another embodiment of this disclosure. In this embodiment, elements of the power transmission module 730, the retracting module 740 and part of the functional module 120 are disposed in an accommodation space 112 of the machine body 110. For a concise explanation, part of the machine body 110 in FIG. 8 are removed so as to expose some elements thereinside, including elements of the power transmission mechanism 730 and the retracting module 740. Differences between the electronic devices 700 of FIG. 8 and the electronic device 600 of FIG. 7 include at least that: the direction of the avoiding-path LB2 is not perpendicular to the moving direction L. The retracting module 740 of the electronic device 700 can include a fastener member 744, and the fastener member 744 includes a first plate 744A, a second plate 744B and a third plate 744C. The first plate 744A has two opposite ends to connect the second plate 744B and the third plate 744C, respectively. The shape of the rack 736 of the power transmission module 730 can be adjusted in accordance with the arrangement of the first plate 744A, the second plate 744B and the third plate 744C. For example, the inner surface B25 of the second plate 744B is parallel to the outer surface B45 of the rack 736, the inner surface B35 of the third plate 744C is parallel to the outer surface B55 of the rack 736, and the inner surface B15 of the first plate 744A face to the bottom surface B65 of the rack 736. The space formed by the first plate 744B, the second plate 744C and the third plate 744A is used for accommodating the rack 736. In this embodiment, an avoiding path is formed between the bottom surface B65 of the rack 736 and the inner surface B15 of the third plate 744A. The teeth 136A of the rack 736 are to mesh the teeth 134A of the gear 134. When the rack 736 moves toward the first plate 744A, the fastener member 744 is used for limiting the direction of the avoiding path (such as the direction of the avoiding path LB2 of FIG. 8). In addition, the normal vector direction V3 of the inner surface B25 of the second plate 744B and the normal vector direction V4 of the inner surface B35 of the third plate 744C are both not parallel to the moving direction L. The inner surface B25 of the second plate 744B and the inner surface B35 of the third plate 744C are both not perpendicular to the moving direction L. Thereupon, the inner surface B25 of the second plate 744B and the inner surface B35 of the third plate 744C can limit the angle formed by the direction of the avoiding path LB2 of the rack 736 and the moving direction L. As shown in FIG. 8, the direction of the avoiding path LB2 is not perpendicular to the moving direction L, but forms an angle with the moving direction L. That is, the rack 736 is moved in a direction not perpendicular to the moving direction L. In this embodiment, a holding unit similar to that shown in FIG. 3 to FIG. 6 can be provided between the third plate 744A and the rack 736.

Figure 9:
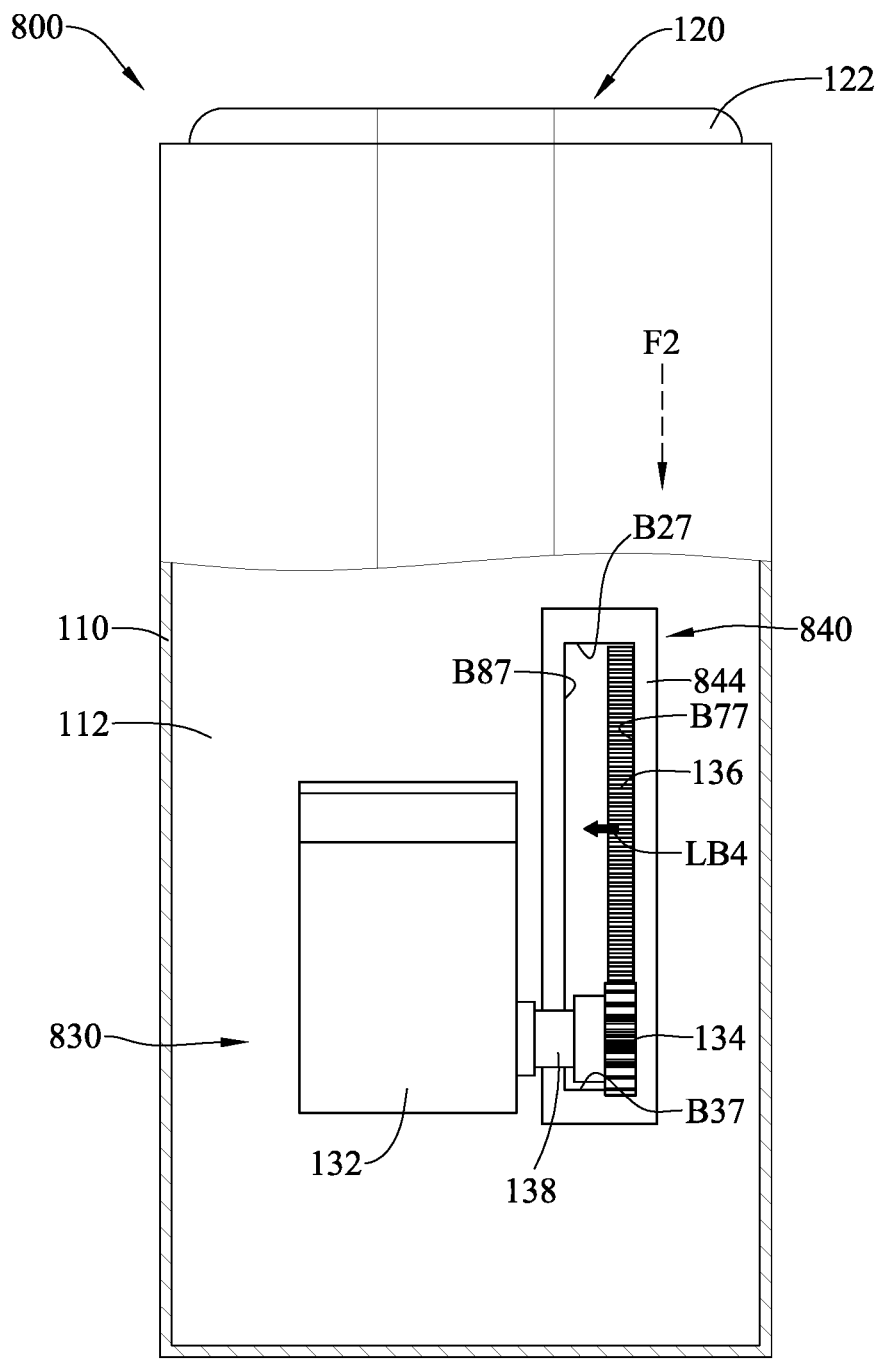
FIG. 9 is a schematic view of the fastener member of the electronic device in accordance with a further embodiment of this disclosure.

FIG. 9 is a schematic view of the fastener member of the electronic device in accordance with a further embodiment of this disclosure. In this embodiment, elements of the power transmission module 830, the retracting module 840 and part of the functional module 120 are disposed in an accommodation space 112 of the machine body 110. For a concise explanation, part of the machine body 110 in FIG. 9 are removed so as to expose some elements thereinside, including elements of the power transmission mechanism 830 and the retracting module 840. It shall be explained that FIG. 9 demonstrates another viewing angle with respect to FIG. 7 and FIG. 8. Referring to FIG. 9, in the power transmission module 830, the rotational shaft 138 is connected with the driving unit 132 and the gear 134. The retracting module 840 can include a fastener member 844 and a holding unit connected with the fastener member 844. In FIG. 9, though the holding unit herein is visually blocked by the rack 136, yet it should be understood that the application of the holding unit can be the spring 242A of FIG. 3, the rubber 342A of FIG. 4, the first magnetic member 442A or the second magnetic member 442B of FIG. 5, or the first spring arm 542A or the second spring arm 542B of FIG. 6. The fastener member 844 includes inner surfaces B27, B37, B77, B87, in which the inner surface B27 is opposite to the inner surface B37, and the inner surface B77 is opposite to the inner surface B87, such that a space is formed for accommodating the rack 136 and the rack 136 abuts against the inner surface B77. In comparison with FIG. 7, the inner surface B27 of the fastener member 844 in FIG. 9 can be seen as the inner surface B20 or B30 of the fastener member 244 in FIG. 7. In the embodiment of FIG. 7 having the avoiding path LB or the embodiment of FIG. 8 having the direction of the avoiding path LB2, both of which have their own racks 136 to disengage the corresponding gears 134 in a direction leaving the gears 134 (i.e., in a radial-out direction of the gear 134). The rack 136 and the gear 134 are arranged oppositely and accordingly. On the other hand, in this embodiment having the direction of the avoiding path LB4 perpendicular to the radial direction of the gear 134, after the gear 134 is pushed by the push F2, the rack 136 will leave the gear 134 in the direction of the avoiding path LB4, which is perpendicular to the radial direction of the gear 134. Though the direction of the avoiding path might be parallel or perpendicular to the radial direction of the gear, yet the performance for the rack 136 to leave the gear 134 would be similar. According to this disclosure, the rack 136 can move to disengage the gear 134 through a displacement in a direction of the avoiding path parallel to a radial direction of the gear 134, or through another displacement in another direction of the avoiding path perpendicular to another radial direction.

Figure 10:
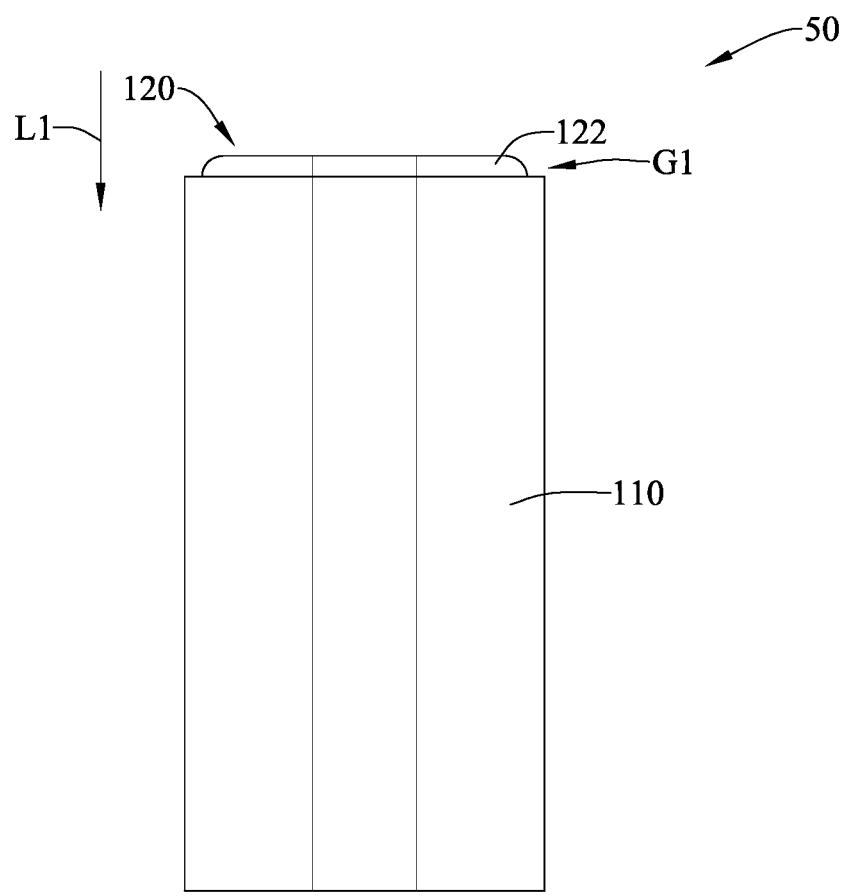
FIG. 10 is a schematic view of a first position of the camera device in accordance with an embodiment of this disclosure.
Figure 11:
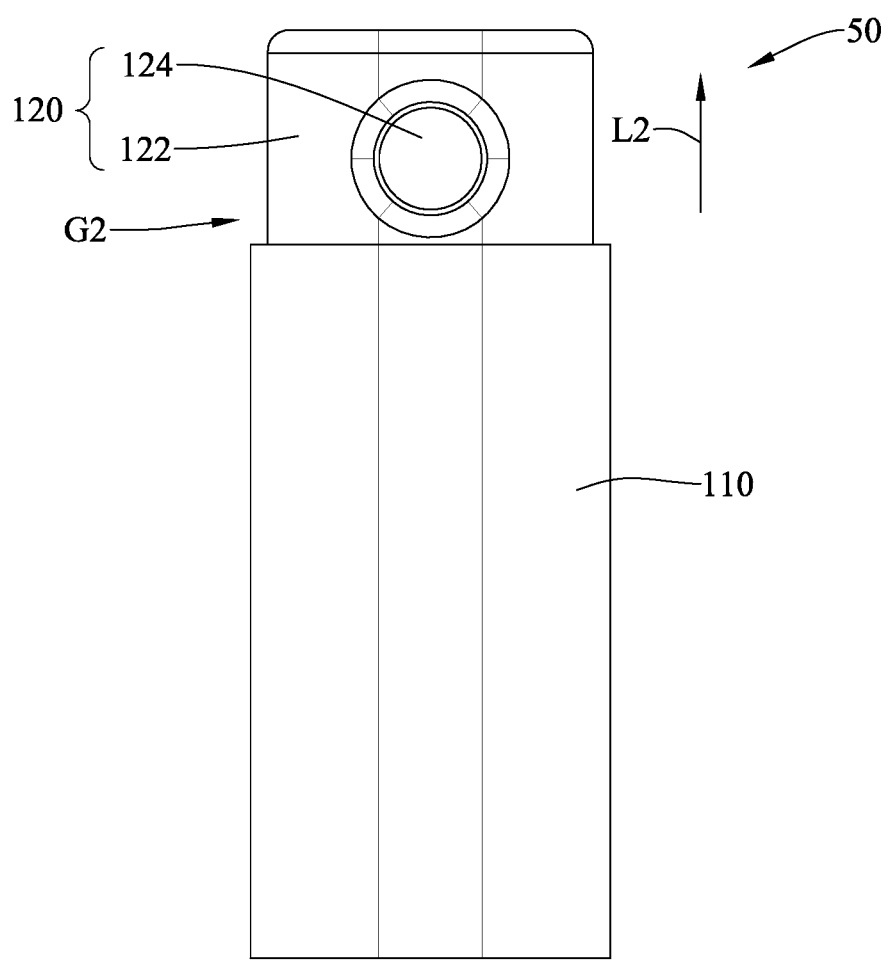
FIG. 11 is a schematic view of a second position of the camera device in accordance with the embodiment of this disclosure.

FIG. 10 is a schematic view of a first position of a camera device in accordance with an embodiment of this disclosure, and FIG. 11 is a schematic view of a second position of the camera device in accordance with the embodiment of this disclosure. Referring to FIG. 10 and FIG. 11, a camera device 50 may include one of the electronic devices 100-800 as shown in FIG. 1 and FIG. 3 to FIG. 9. The functional module 120 of the camera device 50 further includes a photography module 124 disposed at the moving body 122. The camera device 50 can be an IP camera, a video camera or a digital still camera. The photography module 124 can be, for example, an image sensor including a charge coupled device (CCD) or a complementary metal-oxide semiconductor (CMOS).

In this embodiment, the functional module 120 is moved with respect to the machine body 110 so as to allow the photography module 124 to have a first position G1 of FIG. 10 and a second position G2 of FIG. 11. The first position G1 stands for a state of the privacy mode that the photography module 124 is hidden inside the machine body 110. On the other hand, the second position G2 stands for a state of the open mode that the photography module 124 is exposed out of the machine body 110, that is, the privacy mode is turned off. The aforesaid machine body 110 can include one of the power transmission modules 130, 530, 730, 830 in the electronic device 100-800 as shown in FIG. 1 and FIG. 3 to FIG. 9. For example, in FIG. 1, elements of the power transmission module 130, the retracting module 140 and part of the functional module 120 are disposed in the machine body 110. The power transmission module 130 utilizes the gear 134 and the rack 136 as the transmission unit for moving the functional module 120. The teeth 134A of the gear 134 mesh the corresponding teeth 136A of the rack 136 in the moving direction L so as to drive the functional module 120 to move in the moving direction L. By having the functional module 120 to move in the moving direction L, the functional module 120 would move along the ascending direction L2 and transfer from the first position G1 of FIG. 10 to the second position G2 of FIG. 11, or the functional module 120 moves along the descending direction L1 so as to transfer from the second position G2 of FIG. 11 to the first position G1 of FIG. 10, so that the photography module 124 can move between the first position G1 and the second position G2.

Further, the holding unit 142 in the retracting module 140 of FIG. 1 is utilized to provide the rack 136 the direction of the avoiding path LB, so that the rack 136 can be disengaged from the gear 134, and thus the stress concentration between the gear 134 and the rack 136 can be avoided through moving the rack 136. When the rack 136 is moved to have no contact with the gear 134, the photography module 124 in the functional module 120 can have the chance to move directly into the machine body 110 along the descending direction L2. Thereupon, possible damage at the gear 134 or the rack 136 caused by the push can be avoided. In other embodiments, each of the retracting modules 240, 340, 440, 540, 640, 740, 840 in FIG. 3 to FIG. 9 can be applied as the retracting module of this embodiment.

In summary, in the electronic device and the camera device provided by this disclosure, the retracting module is used for providing the rack an avoiding path. Thus, the rack can be disengaged from the gear, the stress concentration between the gear and the rack can be removed, and damage at the gear or the rack due to a push can be avoided.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. An electronic device, comprising:
    a machine body;
    a functional module, moving with respect to the machine body;
    a power transmission module, disposed in the machine body, including:
        a transmission unit, including a gear and a rack; and
        a driving unit, connected with the gear, moving with the functional module, wherein the driving unit rotates the gear in a moving direction to mesh the rack so as to move the functional module in the moving direction; and
        a retracting module, disposed in the machine body, including a holding unit connected to the rack to provide the rack an avoiding path for the rack to disengage the gear, wherein a direction of the avoiding path is different from the moving direction, and the holding unit is used for providing a foreign forcing to force the rack to engage the gear,
    wherein, when the gear is under a push greater than a predetermined value, the rack endures a force larger than a force component of the foreign forcing applying to the rack, then the rack is pushed by the gear to move along the avoiding path, and the rack further moves the holding unit;
    wherein, when the driving unit drives the functional module to move in the moving direction, the force is a sum of the force component of the push applied to the rack, a force component of a gravity of the functional module applied to the rack and a force component of a torque of the driving unit applied to the rack; wherein, when the driving unit does not drive the functional module to move in the moving direction, the force is a sum of the force component of the push applied to the rack and the force component of the gravity of the functional module applied to the rack.

2. The electronic device of claim 1, wherein the retracting module includes a fastener member connected with the holding unit to have the holding unit and the rack to move together and to move with respect to the fastener member, the fastener member is used for limiting the rack to move in the direction of the avoiding path, and the direction of the avoiding path is a direction that the rack moves away from the gear.

3. The electronic device of claim 2, wherein the fastener member includes a first plate, a second plate and a third plate, two ends of the first plate are connected respectively to the second plate and the third plate opposite to the second plate, a space formed by the first plate, the second plate and the third plate is used accommodating the rack, and the avoiding path is formed between the holding unit and the first plate.

4. The electronic device of claim 3, wherein an inner surface of the second plate is parallel to an outer surface of the rack, an inner surface of the third plate is parallel to another outer surface of the rack, a normal vector direction of the inner surface of the second plate is parallel to the moving direction, and a normal vector direction of the inner surface of the third plate is parallel to the moving direction.

5. The electronic device of claim 3, wherein an inner surface of the second plate is parallel to an outer surface of the rack, an inner surface of the third plate is parallel to another outer surface of the rack, a normal vector direction of the inner surface of the second plate is not parallel to the moving direction, and a normal vector direction of the inner surface of the third plate is not parallel to the moving direction.

6. The electronic device of claim 1, wherein the holding unit includes an elastic member, and the rack is located between the elastic member and the gear.

7. The electronic device of claim 2, wherein the holding unit includes an elastic member, and the rack is located between the elastic member and the gear.

8. The electronic device of claim 1, wherein the holding unit includes a first magnetic member and a second magnetic member, the first magnetic member is disposed at the rack, the second magnetic member is disposed at the fastener member, the second magnetic member is disposed oppositely to the first magnetic member, and the first magnetic member is magnetically repulsive to the second magnetic member.

9. The electronic device of claim 2, wherein the holding unit includes a first magnetic member and a second magnetic member, the first magnetic member is disposed at the rack, the second magnetic member is disposed at the fastener member, the second magnetic member is disposed oppositely to the first magnetic member, and the first magnetic member is magnetically repulsive to the second magnetic member.

10. The electronic device of claim 1, wherein the holding unit includes a plurality of spring arms, each of the plurality of spring arms is connected to the rack, and each of the plurality of spring arms is integrated with the rack to form a modified rack.

11. The electronic device of claim 2, wherein the holding unit includes a plurality of spring arms, each of the plurality of spring arms is connected to the rack, and each of the plurality of spring arms is integrated with the rack to form a modified rack.

12. A camera device, comprising:
an electronic device of claim 1, wherein the functional module includes a photography module.

13. An electronic device, comprising:
a machine body;
a functional module, moving with respect to the machine body;
a power transmission module, disposed in the machine body, including:
  a transmission unit, including a gear and a rack; and
  a driving unit, connected with the gear, moving with the functional module, wherein the driving unit rotates the gear in a moving direction to mesh the rack so as to move the functional module in the moving direction; and
  a retracting module, disposed in the machine body, including a holding unit connected to the rack to provide the rack an avoiding path for the rack to disengage the gear, wherein a direction of the avoiding path is different from the moving direction,
wherein the retracting module includes a fastener member connected with the holding unit to have the holding unit and the rack to move together and to move with respect to the fastener member, the fastener member is used for limiting the rack to move in the direction of the avoiding path, the functional module and the fastener member are physically separated from each other, the direction of the avoiding path is a direction that the rack moves away from the gear, the fastener member includes a first plate, a second plate and a third plate, two ends of the first plate are connected respectively to the second plate and the third plate opposite to the second plate, a space formed by the first plate, the second plate and the third plate is used accommodating the rack, and the avoiding path is formed between the holding unit and the first plate;
wherein the holding unit includes a first magnetic member and a second magnetic member, the first magnetic member is disposed at the rack, the second magnetic member is disposed at the fastener member, the second magnetic member is disposed oppositely to the first magnetic member, and the first magnetic member is magnetically repulsive to the second magnetic member.

14. The electronic device of claim 13, wherein an inner surface of the second plate is parallel to an outer surface of the rack, an inner surface of the third plate is parallel to another outer surface of the rack, a normal vector direction of the inner surface of the second plate is parallel to the moving direction, and a normal vector direction of the inner surface of the third plate is parallel to the moving direction.

15. The electronic device of claim 13, wherein an inner surface of the second plate is parallel to an outer surface of the rack, an inner surface of the third plate is parallel to another outer surface of the rack, a normal vector direction of the inner surface of the second plate is not parallel to the moving direction, and a normal vector direction of the inner surface of the third plate is not parallel to the moving direction.

16. A camera device, comprising:
an electronic device of claim 13, wherein the functional module includes a photography module.

17. An electronic device, comprising:
a machine body;
a functional module, moving with respect to the machine body;
a power transmission module, disposed in the machine body, including:
  a transmission unit, including a gear and a rack; and
  a driving unit, connected with the gear, moving with the functional module, wherein the driving unit rotates the gear in a moving direction to mesh the rack so as to move the functional module in the moving direction; and
  a retracting module, disposed in the machine body, including a holding unit connected to the rack to provide the rack an avoiding path for the rack to disengage the gear, wherein a direction of the avoiding path is different from the moving direction,
wherein the holding unit includes a first magnetic member and a second magnetic member, the first magnetic member is disposed at the rack, the second magnetic member is disposed at the fastener member, the second magnetic member is disposed oppositely to the first magnetic member, and the first magnetic member is magnetically repulsive to the second magnetic member.

* * * * *